April 16, 1940.   M. B. RATNER   2,197,317
SAFETY STEERING WHEEL
Filed Dec. 31, 1937   2 Sheets-Sheet 1
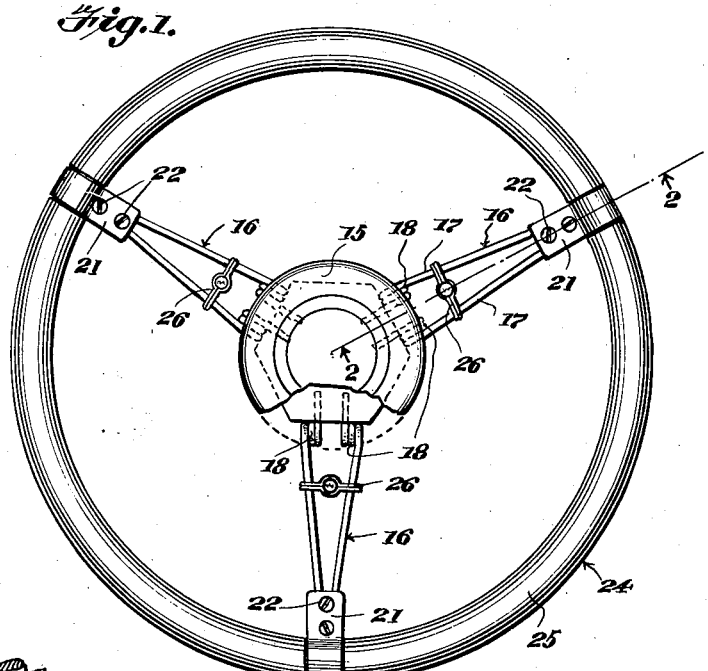
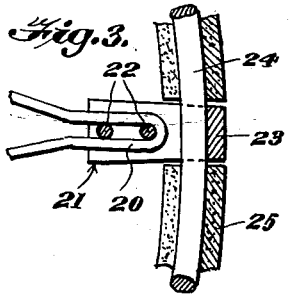
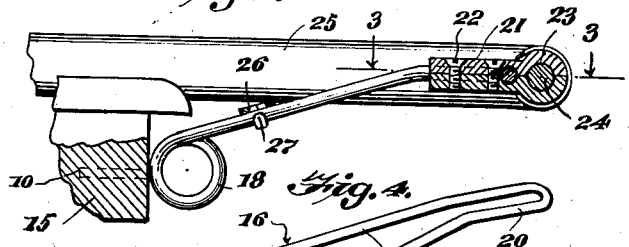
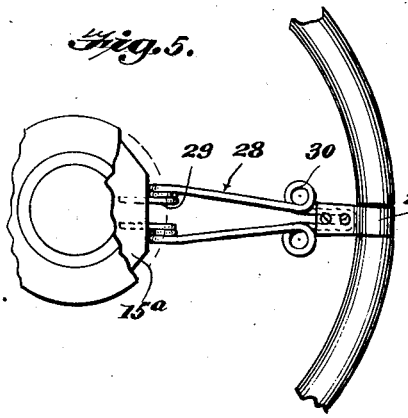
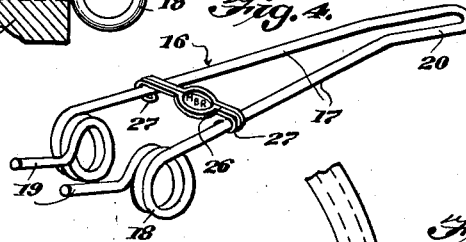
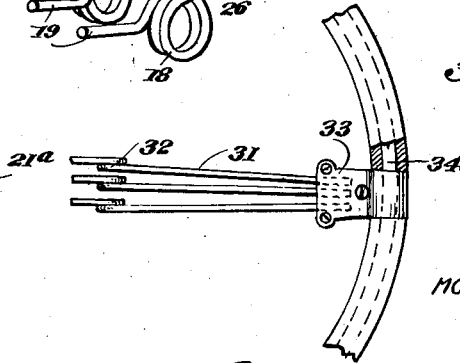
Inventor
MORRIS B. RATNER
By Irving R. McCathran
Attorney April 16, 1940.                M. B. RATNER                2,197,317
                            SAFETY STEERING WHEEL
                            Filed Dec. 31, 1937            2 Sheets-Sheet 2
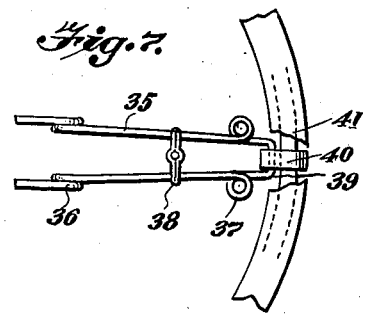
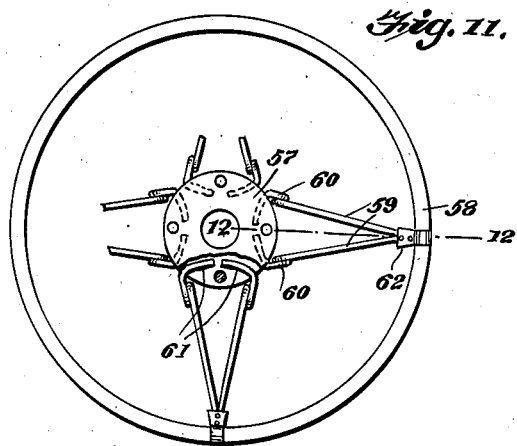
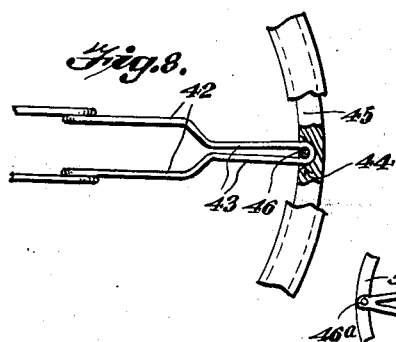
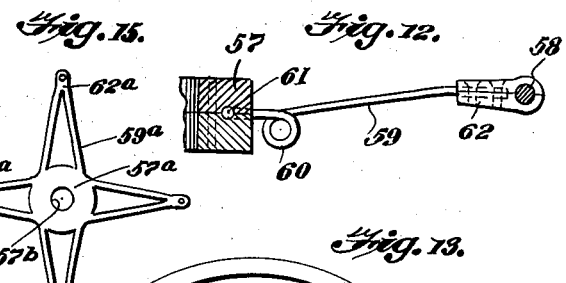
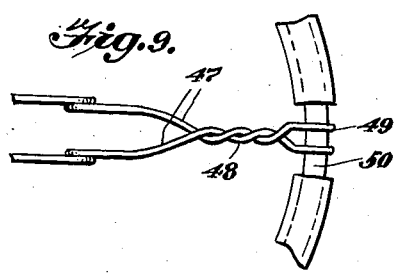
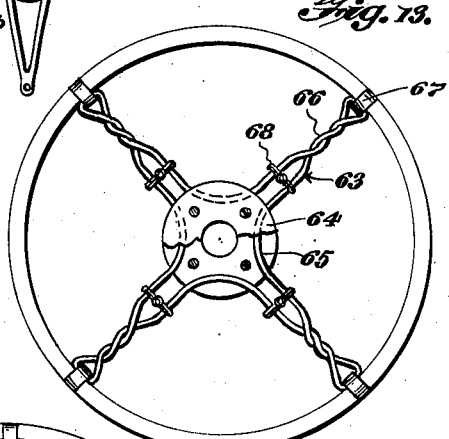
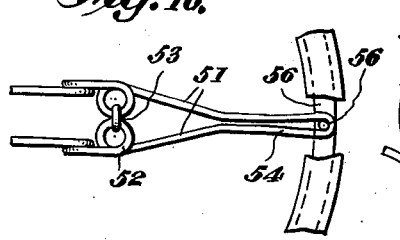
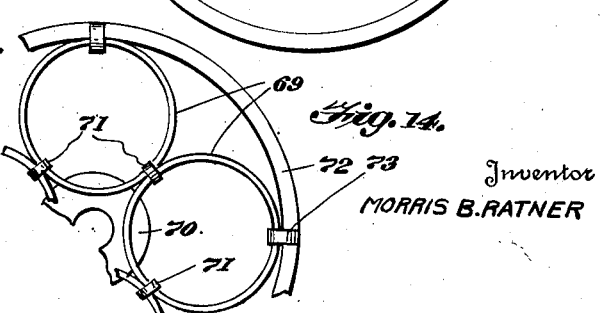
Inventor
MORRIS B. RATNER
By Irving L. McCathran Attorney Patented Apr. 16, 1940

2,197,317

UNITED STATES PATENT OFFICE 2,197,317

SAFETY STEERING WHEEL

Morris B. Ratner, Phoenix, Ariz.

Application December 31, 1937, Serial No. 182,890

5 Claims. (Cl. 74—552)

This invention relates to safety steering wheels, and has for one of its objects the production of a simple and efficient steering wheel wherein the spring spokes are attached to the rim by means of a flexible or bearing hinge joint, to permit the rim to change its angular position in relation to the hub of the wheel and the spokes, when pressure is exerted on the rim.

A further object of this invention is the production of a simple and efficient steering wheel, wherein the spring spokes or spokes of other types may be replaced and interchanged, for the purpose of repair or the building or assembling of differently appearing designs, styles, sizes, finishes and degrees of flexibility of the steering wheel.

Another object of this invention is the production of a simple and efficient clip or bracing means for the spring spokes of a steering wheel which will be decorative and constitute an attractive ornamentation.

Other objects and advantages of this invention will appear throughout the following specification and claims.

In the drawings:

Figure 1 is a plan view of the wheel showing one type of spring spoke;

Figure 2 is a sectional view taken on line 2—2 of Figure 1;

Figure 3 is a sectional view taken on line 3—3 of Figure 2;

Figure 4 is a perspective view of a modified form of spring spoke;

Figure 5 is a top plan view of a portion of a steering wheel illustrating a further modified form of spoke construction;

Figure 6 is a top plan view of a still further modified form of spoke construction, a portion of a rim being also shown;

Figures 7 to 10 inclusive are top plan views of other modified forms of spoke construction;

Figure 11 is a top fragmentary plan view of a portion of a steering wheel showing a different type of spoke;

Figure 12 is a sectional view taken on line 12—12 of Figure 11;

Figure 13 is a top plan view of a steering wheel having a form of spoke, wherein the strands are twisted;

Figure 14 is a fragmentary plan view of a steering wheel, wherein the spokes are of a ring-like structure;

Figure 15 is a plan view of a modified form of the invention wherein the spokes and hub portion are all formed integral from flat steel or similar material.

By referring to the drawings, it will be seen that 15 designates the hub of the wheel which supports the radiating spring spokes 16. Each spoke 16 comprises the strands 17 which are provided with coils 18 near their inner ends extending in the same plane with the longitudinal axis of the strands 17. The inner ends 19 of the strands 17 are embedded in the hub 15 as shown in Figure 2. The strands 17 preferably converge toward the outer ends of the spokes 16 and provide a loop 20. A sectional hinge clamp 21 is clamped over the loop 20, the sections being held together by the screws 22. The hinge clamp 21 is provided with a journal portion 23 which hingedly fits over or straddles the rim 24, as shown in Figures 2 and 3. A suitable grip or covering 25 may be provided for the rim 24.

A decorative or designating clip 26 spans or extends across the strands 17 which clip may carry the driver's initials, monogram, lodge or fraternal insignia, a photo or any selected device, design or illustration. The clip 26 is secured to the strands 17 by means of the hooks 27 which fit around the strands 17 and also tend to hold the strands from spreading.

As shown in Figure 5 there is illustrated a modified form of spoke construction somewhat similar to that shown in Figure 1, the spoke being indicated by the numeral 28 and having spring coils 29 located near their inner ends in a plane extending substantially longitudinally of the spoke. Additional coils 30 are arranged near the forward ends of the strands of the spoke 28, these coils 30 extending at right angles to the coils 29. The forward or outer end of the spoke 28 carries a hinge clamp 21a similar to the clamp 21 shown in Figure 1 which hingedly engages the rim of the wheel in a manner similar to that shown in Figure 1.

In Figure 6, there is shown a further modified form of the invention wherein the spoke consists of three converging strands 31 having coils 32 near their inner ends, the forward ends of the strands 31 being embedded in the hinge clamp 33, which hinge clamp engages the rim 34 in a manner similar to that shown in Figure 1, the hinge clamp 33 being slightly different in design.

In Figure 7 there is shown another modified form of spoke structure comprising a pair of strands 35 which are provided with oppositely arranged coils 36 and 37 near the respective ends, and a suitable clip 38 spans the strands 35 as shown. The forward ends of the strands 35 are connected by a bridge portion 39 which is journaled within a securing clip 40 to provide a hinge connection, the clip 40 being secured to the rim 41 as shown.

In Figure 8, there is shown a still further modified form of spoke structure wherein the spoke comprises a pair of strands 42 which are drawn in toward each other to provide substantially closely arranged parallel portions 43, the forward ends of the parallel portions 43 being looped through a notch 44 in the rim 45 behind a securing portion 46 of the rim 45 providing a flexible or hinge connection for the outer end of the spoke.

In Figure 9 there is shown a still further modified form of the invention wherein a spoke comprises a pair of strands 47 which are twisted, as at 48, and are provided with a forward hook portion 49 which hooks over the rim 50.

In Figure 10 there is shown a still further modified form of the invention wherein the spoke comprises a pair of strands 51 having inwardly extending coils 52 which are connected by a link 53, the forward ends of the strands 51 being drawn in substantially close parallel relation to provide a forwardly extending loop 54 which passes around a suitable pin 55 carried by the rim 56 to provide a flexible or hinge connection with the rim for the outer end of the spoke.

In Figures 11 and 12, I have illustrated another form of the invention wherein the hub is designated by the numeral 57 and the rim by the numeral 58. Radiating spokes are provided of a special type comprising strands 59 having coils 60 near their inner ends, the inner ends of the strands 59 being bent inwardly toward each other to provide inwardly extending connecting portions 61 which fit into the hub 57, as shown. The forward ends of the strands 59 carry hinge clamps 62 which hingedly engage the rim 58, as shown in Figures 11 and 12.

Figure 13 shows a type of wheel and hub structure wherein the spokes may all be formed of one piece or strand of wire or other similar metal preferably of a spring type and the spokes are indicated by the numeral 63 which radiate from the hub 64. The various spokes are connected by an intermediate inwardly bowed portion 65 which is secured to the hub 64 and each spoke comprises outwardly extending strands which are twisted, as at 66, and are hingedly secured to the rim by hinge clamps 67. A suitable clip 68 spans the strands of the spoke 63, as shown.

Figure 14 illustrated a still further modified type of spoke structure wherein the spokes comprise ring-like members 69 which are arranged about the hub 70 and engage the hub 70, as shown, the adjacent ring-like spokes 69 being connected by clips 71 at their abutting points and the ring 69 being also hingedly secured to the rim 72 by means of the hinge clamps 73.

It should be borne in mind that one of the important features of the invention is the fact that the outer ends of the spring spokes are connected to the rim in all instances by means of a flexible joint thereby allowing the rim to be pressed downwardly. When the rim is pressed below the line of connection of the spoke with the hub, it is necessary that the spoke have a flexible connection with the rim to provide sufficient play to permit the change of angle for both the rim and the spoke.

In Figure 15 it will be noted that the hub section 57a is formed integral with the spokes 59a, the hub section 57a being provided with a central opening 57b for the purpose of fitting over the steering wheel shaft. The outer ends 62a of the spokes 59a are suitably constructed for detachable connection with a removable rim 58a by means of a suitable bolt or other securing means 46a.

It should be further understood that a wheel assembly is provided which may be built up from parts which are interchangeable and thereby facilitate the building or assembling of wheels of different appearance, variation in design, style, size, finish and flexibility. This will permit the placement of rims of various textures, materials, size or color, or the replacement of parts for repair and will permit the design of the wheel to be changed or its appearance changed to harmonize or fit in with the particular type of vehicle upon which it is used and at the same time add safety and increase the ease by which the vehicle may be handled. The parts may be easily substituted and rearranged and various designs may be employed by rearranging the various types of spokes illustrated in suitable selected groups. The spokes of one design may be readily removed from one wheel and spokes of other designs may be rearranged or substituted without impairing the operativeness or appearance of the wheel. The spokes may be single, dual, or multiple patterned without departing from the spirit of the invention. Furthermore, should repair or replacement be needed, the damaged part may be merely replaced and the parts substituted quickly with tools now in general use. The flexible joint provided and described above will provide an effective and beneficial shock absorber, and the parts may be of any suitable or desired material without departing from the spirit of the invention, and it is not desired to limit the present invention to any particular type of strands which may be used for the spokes since they may be of a spring wire structure, flat spring steel, or any other desired type without departing from the spirit of the invention.

Because of the connection of the spokes of the various types shown in the drawings, it should be noted that the rims of the various types are removable or detachable. For instance, in the type shown in Figures 1, 2 and 3, the rim 24 is detachable from the spoke portions of the wheel due to the detachable connection provided by the hinge clamp 21. It is quite important to provide a replaceable or removable rim to facilitate replacement and repair as well as assembly.

It is not desired to limit the present invention so far as the assembly of the device is concerned, to the use of spring spokes, and it is also desired to point out that the replaceable rim structure or assembly may be associated with rigid spokes without departing from the spirit of the invention, and the substitution of rigid spokes for the spring spokes, so far as the replaceable rim feature is concerned, falls clearly within the scope of the present invention.

The feature of a removable, replaceable, or exchangeable rim for steering wheels will permit of a variety of assembly in connection with the safety wheel, or in connection with the change of design of the wheel. The present structure described, illustrated and claimed in this application provides for an assembly of a safety steering wheel, the parts of which are interchangeable, both as to the spring spoke features and the substitution of rigid spokes if desired. This will greatly add to the possibility of interchanging the various parts to change the size of the wheels when assembling the various parts. The wheel may be changed as to color, design, pattern, and finish, as well as to flexibility. The spring action of the wheel when spring spokes are employed, is an essential feature in easing driving strain, absorbing vibration and shock, and at the same time permitting the wheel to bend without injury to the driver in case of accident. The decorative clip of initials, insignia, and the like, also greatly adds to the attractiveness of the device.

Certain detail changes in construction, as well as arrangement of parts may be employed without departing from the spirit of the invention, so long as such changes fall within the scope of the appended claims.

Having described the invention, what I claim as new is:

1. A wheel of the class described comprising a hub, spring spokes anchored at their inner ends to said hub, a rim, and a sectional hinge clip carried by the outer end of each spoke and straddling said rim for providing a bearing hinge joint upon the rim.

2. A wheel of the class described comprising a hub, spring spokes anchored at their inner ends to said hub, a rim, a sectional hinge clip carried by the outer end of each spoke and straddling said rim for providing a bearing hinge joint upon the rim, and each spoke comprising a plurality of strands having coils the axes of which extend transversely with respect to the longitudinal axis of the strands.

3. A wheel of the class described comprising a hub, spring spokes anchored at their inner ends to said hub, a rim, a sctional hinge clip carried by the outer end of each spoke and straddling said rim for providing a hinge joint upon the rim, and a bracing yoke straddling said strands and bracing the strands against spreading.

4. A wheel of the class described comprising a hub, spring spokes anchored at their inner ends to said hub, a rim, a sectional hinge clip carried by the outer end of each spoke and straddling said rim for providing a hinge joint upon the rim, a bracing yoke straddling said strands and bracing the strands against spreading, and said yoke having a decorating panel adapted to receive an identifying medium.

5. As a new article of manufacture, a spring spoke for steering wheels comprising a plurality of substantially parallel strands having coils arranged intermediate their lengths, the strands terminating at their outer ends in an extended loop, and a sectional hinge clamp removably secured to said loop and adapted to hingedly engage the rim of a steering wheel.

MORRIS B. RATNER.